Nov. 25, 1941.    E. POLLARD    2,263,954
BELT FASTENER
Filed Nov. 17, 1939

Inventor
Ernest Pollard.
By Eugene E. Stevens
Atty.

Patented Nov. 25, 1941

2,263,954

UNITED STATES PATENT OFFICE 2,263,954

BELT FASTENER

Ernest Pollard, Bradford, England, assignor of one-half to Hermann Pollard, Bradford, England Application November 17, 1939, Serial No. 305,021
In Great Britain November 25, 1938

1 Claim. (Cl. 24—123)

The invention relates to fastenings, for connecting the ends of round-section belts, of the type in which hooked members secured to the respective belt ends are connected by a ring or link of suitable material.

The present invention has for one of its objects to provide a construction of fastening of the type referred to which will prove durable when subjected to heavy loads. A further object is to provide a construction of fastening which will be particularly well adapted to connect the ends of a round-section belt composed of a cotton core of spun, woven, or braided material into and around which there has been pressed a covering of rubber compound moulded externally to the desired section.

According to the invention two cylindrical blocks or members of metal, corresponding substantially in diameter to the belt concerned, have each in one end a socket or recess of circular cross-section into which one end of the belt, appropriately reduced in diameter is inserted and secured by means of a transverse pin passing through aligned holes in the wall of the socket or recess and in the belt end, the opposite ends of the cylindrical blocks or members being fashioned into hooks which are connected by means of a ring or link.

A fastening according to the invention differs from any fastening hitherto proposed for round-section belts, especially those having a core of spun, woven, or braided material, in that a much better grip is obtained on the belt ends. The recesses in the cylindrical blocks into which the reduced-diameter ends of the belt fit are made of substantially similar diameter to the belt ends and the transverse openings in the belt ends through which the securing pins pass are made of slightly less diameter than the pins so that the insertion of the pins swells out the already closely fitting belt ends and causes them to become very tightly wedged in the recesses.

Figure 1:
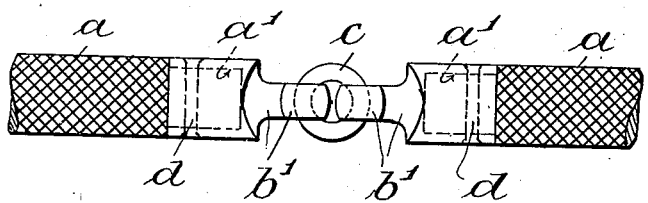
Fig. 1 is a top elevational view of the device.
Figure 2:
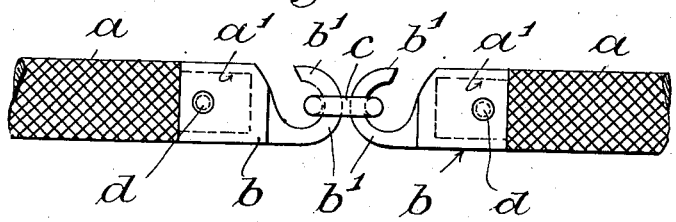
Fig. 2 is a side elevational view of the device shown in Fig. 1.

In the accompanying drawing $a$, $a$, represent the ends of a belt to be connected, and $b$, $b$, are cylindrical blocks or socket members applied to the ends $a'$, $a'$, of the belt, said ends being reduced in diameter and fitting into recesses of circular section formed in the members $b$, the said members having formed integral with them hook portions $b'$, which are connected by a ring or link $c$ of suitable material such, preferably, as compressed fibre or a synthetic resin.

The members $b$ are preferably made from solid blocks of metal though they might be made from sheet metal suitably stamped and bent to shape.

The members $b$ are secured on the belt ends by means of pins $d$, extending transversely through openings in them and in the belt ends. The openings in the belt ends are made of slightly less diameter than the pins so that as the latter are inserted they swell out the belt ends and cause them to bind tightly in the recesses or sockets.

Having thus described my invention, what I claim as new and desire to secure by Letters Patent is:

A belt fastening for a round-section belt comprising a pair of cylindrical members of the same diameter as the belt, each member having in one end a socket of reduced diameter to receive a reduced end portion of the belt, each of said members having aligned transverse holes at the site of said sockets, a transverse pin arranged in said holes and through the reduced end portion of the belt whereby to effect a tight frictional connection, hooks formed at the closed ends of said members, and a loop member connecting said hooks.

ERNEST POLLARD.